United States Patent
Schrader et al.

(10) Patent No.: US 7,456,858 B2
(45) Date of Patent: Nov. 25, 2008

(54) DISTRIBUTED MCU

(75) Inventors: Thies Schrader, Haslum (NO); Axel Dahl, Oslo (NO); Magnus Rekkedal, Oslo (NO)

(73) Assignee: Tandberg Telcom AS, Lysaker (NO)

( * ) Notice: Subject to any disclaimer, the term of this patent is extended or adjusted under 35 U.S.C. 154(b) by 1097 days.

(21) Appl. No.: 10/856,472

(22) Filed: May 28, 2004

(65) Prior Publication Data
US 2005/0007446 A1    Jan. 13, 2005

(30) Foreign Application Priority Data
Jul. 7, 2003    (NO) .................................. 20033106

(51) Int. Cl.
*H04N 7/14*    (2006.01)
*H04M 3/42*    (2006.01)

(52) U.S. Cl. .............. 348/14.09; 348/14.08; 348/14.12; 370/260

(58) Field of Classification Search ... 348/14.01–14.16; 370/260–261; 709/204, 205; 715/753, 755, 715/751; 379/202.01
See application file for complete search history.

(56) References Cited

U.S. PATENT DOCUMENTS

| | | | | |
|---|---|---|---|---|
| 5,473,363 | A | * | 12/1995 | Ng et al. .................. 348/14.09 |
| 5,594,725 | A | | 1/1997 | Tischler et al. |
| 5,737,010 | A | * | 4/1998 | Yachi et al. .............. 348/14.09 |
| 6,157,401 | A | | 12/2000 | Wiryaman |
| 6,590,603 | B2 | | 7/2003 | Sheldon et al. |
| 2002/0036707 | A1 | | 3/2002 | Gu |
| 2002/0071026 | A1 | | 6/2002 | Agraharam et al. |
| 2003/0081112 | A1 | | 5/2003 | Sheldon et al. |
| 2003/0147357 | A1 | | 8/2003 | Zhang et al. |

FOREIGN PATENT DOCUMENTS

| | | |
|---|---|---|
| EP | 1 359 708 A1 | 11/2003 |
| WO | WO-01/35655 A2 | 5/2001 |
| WO | WO-02/060126 A1 | 8/2002 |

OTHER PUBLICATIONS

Procedures for establishing communication between three or more audiovisual terminals using digital channels up to 1920 kbit/s, H.243 (02/000) ITU-T Standard Superseded (S), International Telecommunication Union, Geneva, Feb. 17, 2000, pp. 1-52. XP 17404762A.

System for establishing communication between audiovisual terminals using digital channels up to 2 Mbit/s, H.242 (May 1999), ITU-T Standard Superseded (s), International Telecommunication Union, Geneva, May 1, 1999, pp. 1-77, XP017401349A.

* cited by examiner

*Primary Examiner*—Melur Ramakrishnaiah
(74) *Attorney, Agent, or Firm*—Birch, Stewart, Kolasch & Birch, LLP

(57) ABSTRACT

The present invention relates generally to conferencing network systems and more specifically to a method and a device for automatic generation and allocation of optimized setup of multiple end points (EPs) to multi site connection units (MCUs) in a distributed video conference system according to a weighting function.

Figure 1:
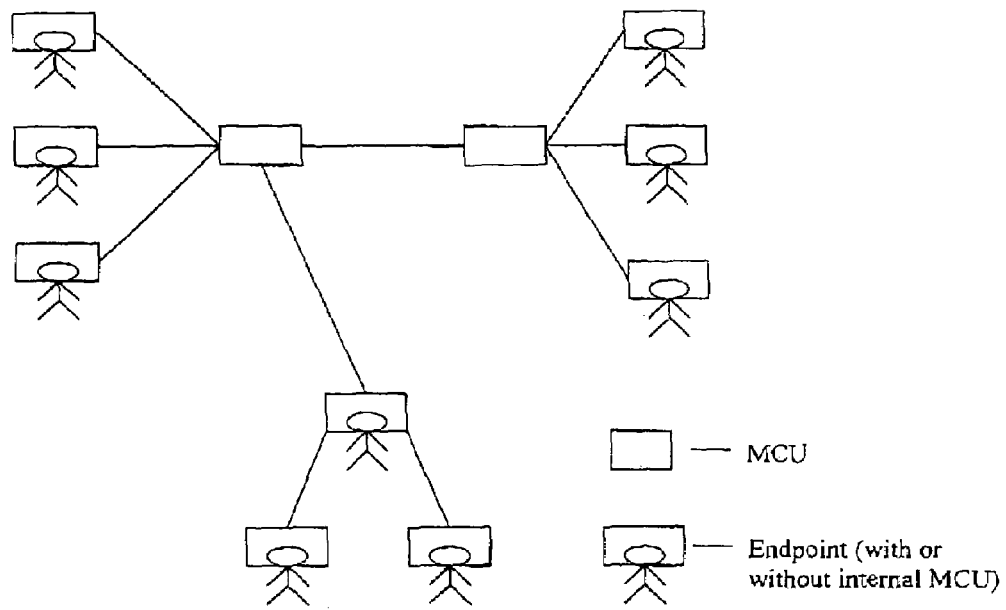

The invention further relates to a method and device for monitoring and administering distributed MCUs connected together and set up in a call in a distributed video conference system. By gathering and merging call information the method and system is capable of sending a specific command to the MCU capable of executing the command.

17 Claims, 3 Drawing Sheets

DISTRIBUTED MCU

FIELD OF THE INVENTION

The present invention relates generally to video conferencing network devices and more specifically to a method and a device for automatic generation and allocation of optimized setup of multiple end points to multi site connection units in a distributed video conference.

The invention further relates to a method and device for monitoring and administering a concept of a distributed MCU, including a master MCU and one or several slave MCUs, connected together in a call in a distributed video conference:

BACKGROUND OF THE INVENTION-PRIOR ART

Video- and audio-conferencing is a technology used for communication over long distances. Due to many problems occurring during call setup and call-management, many solutions require conferencing administrators to setup and administrate the conference. To ease the job of call set-up and conference administration, many large organizations and service providers use a centralized server called a Multi-point Control Unit (MCU). A MCU is a server used to handle calls with multiple participants, or to allow central call management of calls from 2 to n participants.

Administrating the call by only having access to end points (EPs) is not a viable solution due to network access limitation, training and education needed to understand equipment from multiple vendors and different versions from the same vendor. An end point (EP) is defined as the video/audio terminal/telephone or gateway used in a video conference.

By having a centralized server (i.e. MCU), conferencing administrators can control most aspects of the call from one single interface. As most MCUs allow multiple conferences, administrators can also monitor multiple calls from the same interface.

Today, there are systems that help manage end points and MCUs like Polycom GMS, Polycom Conference Suite (also known as Applied Global Technologies (AGT) VCAS) and Forgent VNP—however they do not solve the problem of a single call set-up and management interface. They still require an administrator to understand the different devices on the network.

Polycom GMS allows monitoring of calls between end points only. Polycom Conference Suite (AGT VCAS) allows monitoring of calls at a system by system level.

Forgent VNP allows monitoring of calls and call set-up at a system by system level.

TANDBERG Management Suite allows monitoring of calls at a system by system level.

There are several publications describing different technical aspects of video conferencing.

U.S. Pat. No. 6,157,401 describes a gatekeeper used in a video conferencing system for controlling the alias addresses of EPs logging on the system. It is checked whether an address is a "compound address", and if so ensure that the MCU allocates conference resources to a video conference among the participants thereby designated.

EP-1359708 describes a method for creating a video connection from a video communication terminal with other participants in a video conference.

US-2003/0147357 describes a method for calling video communication service by video communication terminal and associated message data form. More specifically it describes a method for setting up a videoconference by the use of MCUs and caller convening conference mode.

US-2002/0071026 describes an apparatus and method for incorporating virtual video conferencing environments. More specifically it describes an apparatus and method for determining if a user logging on to the system has designated an alternative environment other than a default environment normally detected by a camera device during the video conference. If this is the case, an environment processor obtains the environment from an environment database, and the video conference apparatus uses the designated environment. If it is not the case, the environment processor sends a listing of the possible environments, and the user can then select the preferred environment from this list. If a user does not wish to select an alternative environment, the default environment will be selected.

U.S. Pat. No. 5,594,725 describes a process and system for videorate control.

US-2002/0036707 describes a method for filtering artifacts from multi-threaded video.

U.S. Pat. No. 6,590,603 describes a system and method for managing streaming data.

These publications describe more or less relevant aspects of video conferencing with regard to the present invention. The latest three publications are included as general background art in the video conferencing technology.

Existing video- and audio-conferencing systems allow you to go into the system and monitor/edit calls. TMS, Forgent VNP and Polycom Conference Suite also allows you to do call setup, but do not handle cascaded MCU connections, or monitoring the conference as one entity—just at a system by system level.

There are multiple problems with using centralized servers (MCUs). They may have large size and cost due to the requirement to handle peek conditions. To handle most conditions MCUs are often over sized compared to average use and conference numbers. This is a requirement to handle peek conditions typically occurring during main business hours. Typically this problem is not due to the size of a single conference, but to the amount of conferences taking place. As point-to-point calls also require management, these must also be routed through the centralized server, requiring resources.

Increased call costs due to placement of server is an important factor. As it is typical to have only a few large centralized servers (MCUs) all calls must be dialled to go to and from the centralized server. For example if the company has an MCU located in London England—if a call is to be made between a location in Sweden and Norway, a call must be made between the site in Sweden and the MCU in London, and another call must be made between the site in Norway and the MCU in London. If there was no centralized management requirement, this call could be made with just one call directly between the sites in Norway to Sweden.

A centralized video- and audio-conferencing server is no different than other servers, in that if the server fails, all calls routed through the server will also fail, i.e. single point of failure.

In regards to the problems described above, the solution according to the invention has the following advantages:

Large size and cost due to the requirement to handle peek conditions is greatly minimized. As no single conference server (MCU) is required, multiple smaller units, or MCUs available directly in some end points can be used. There is also no need to oversize the amount of MCUs as there is much smaller overhead to handle many conferences as point-topoint calls will be dialed direct whereas calls requiring many participants that no single MCU can handle, will be split between many smaller MCU.

As there no longer is a requirement for single points of administration requiring a large MCU, many smaller MCUs can be placed through the business areas of a company, thus reducing the call costs due to placement of servers. Also as many end points have internal MCU capabilities, or calls are only between two systems—no need to dial an external MCU is required, allowing the call to be made directly between the systems in the conference.

Since the solution will work even if some of the MCU are not reachable or down, there is no single point of failure.

OBJECTS AND SUMMARY OF THE INVENTION

An object of the invention is to provide a method and device as mentioned in the introduction which overcomes the described disadvantages of the prior art.

A first aspect of the invention is therefore to provide a method and device for automatic generation and allocation of optimized setup of multiple end points (EPs) to multi site connection units (MCUs) in a distributed video conference system. The method comprises a first step of estimating the number of MCUs needed, based on the number of EPs required to be connected in a video conference session, followed by a second step, checking that there is a sufficient number of MCUs available according to the estimation by allocating each EP to an MCU, and a last optimizing step with final allocation of EPs to MCUs, by connecting EPs to MCUs according to a weighting function.

When a scheduled meeting contains more conference systems than the available resources on any single MCU on the network, it is necessary to cascade the MCUs. The inventive method will automatically set up cascaded MCU calls.

The EPs and MCUs may in some cases be the same physical device.

A second aspect of the invention is to provide a method and device for monitoring and administering many video conference devices within a network. The method comprises a first step of gathering and merging call information such as protocols and duration from the devices in the call, followed by checking whether the master device is capable of carrying out a specific command upon receiving an administration function, followed by checking whether the slave devices are capable of carrying out the specific command if the master device is not capable of performing said command, followed by checking whether the end point (EP) that the commands is going to be carried out on is capable of carrying out the specific command if the master or slave devices are not capable of performing this command. The final step is to execute the command on the devices capable of carrying out the specific command.

A device can be any element used in the call setup of two or more video conferences, i.e. MCU, Gateway (connecting different networks together, e.g. IP and ISDN), Gatekeeper (act as the central control point and provides call control services to registered end points), and EP etc.

The objects stated above are achieved by means of a method and a device as set forth in the appended set of claims.

DETAILED DESCRIPTION OF A PREFERRED EMBODIMENT

Figure 2:
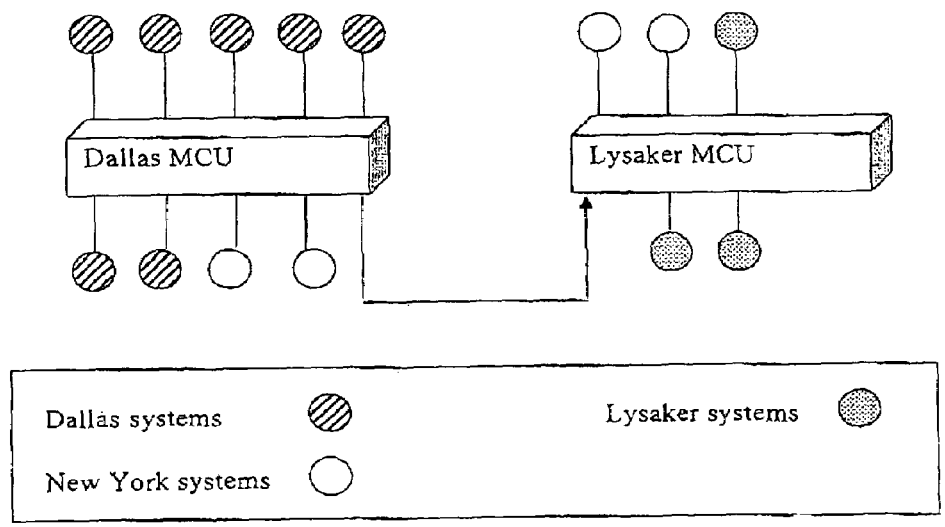
Figure 3A:
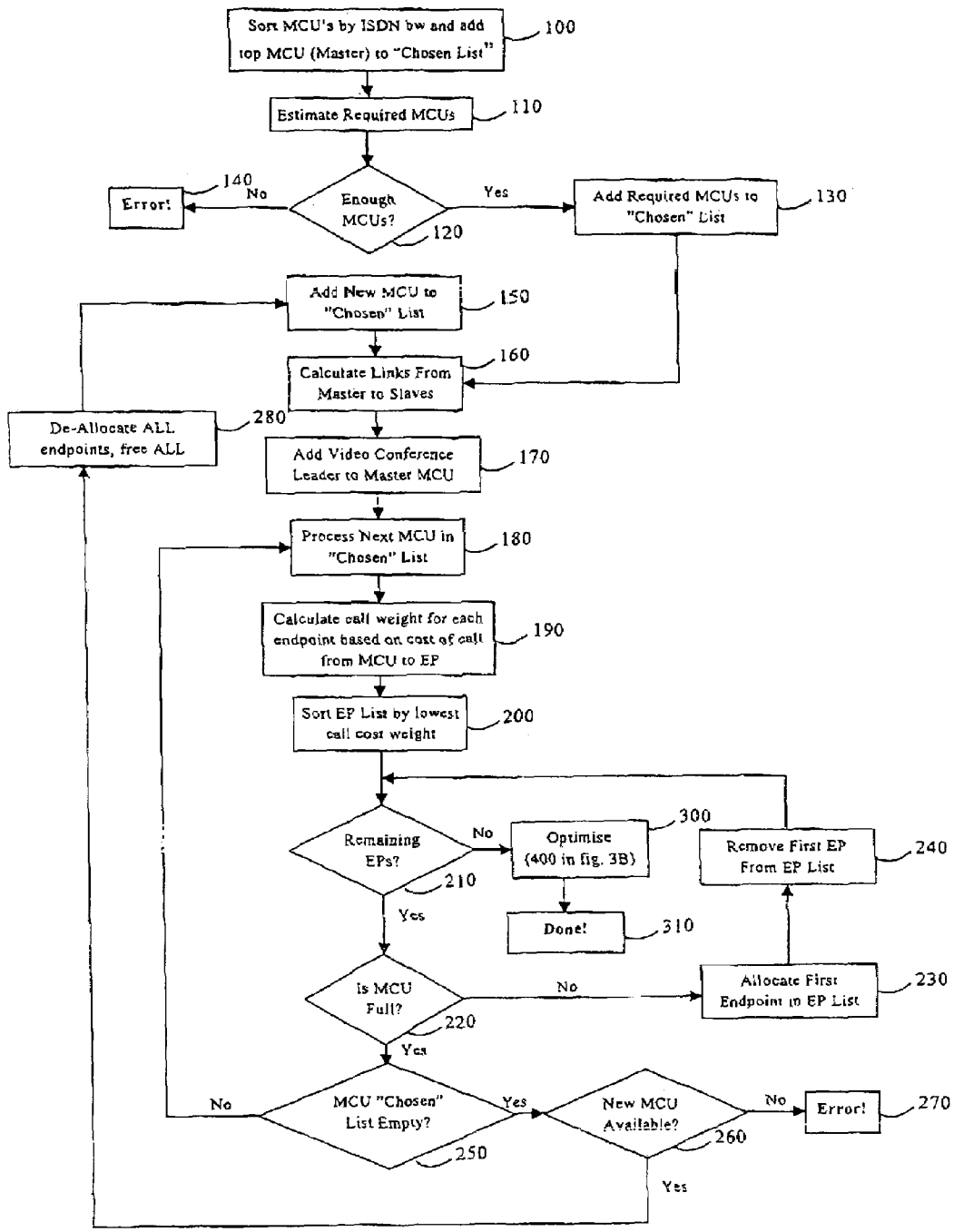
Figure 3B:
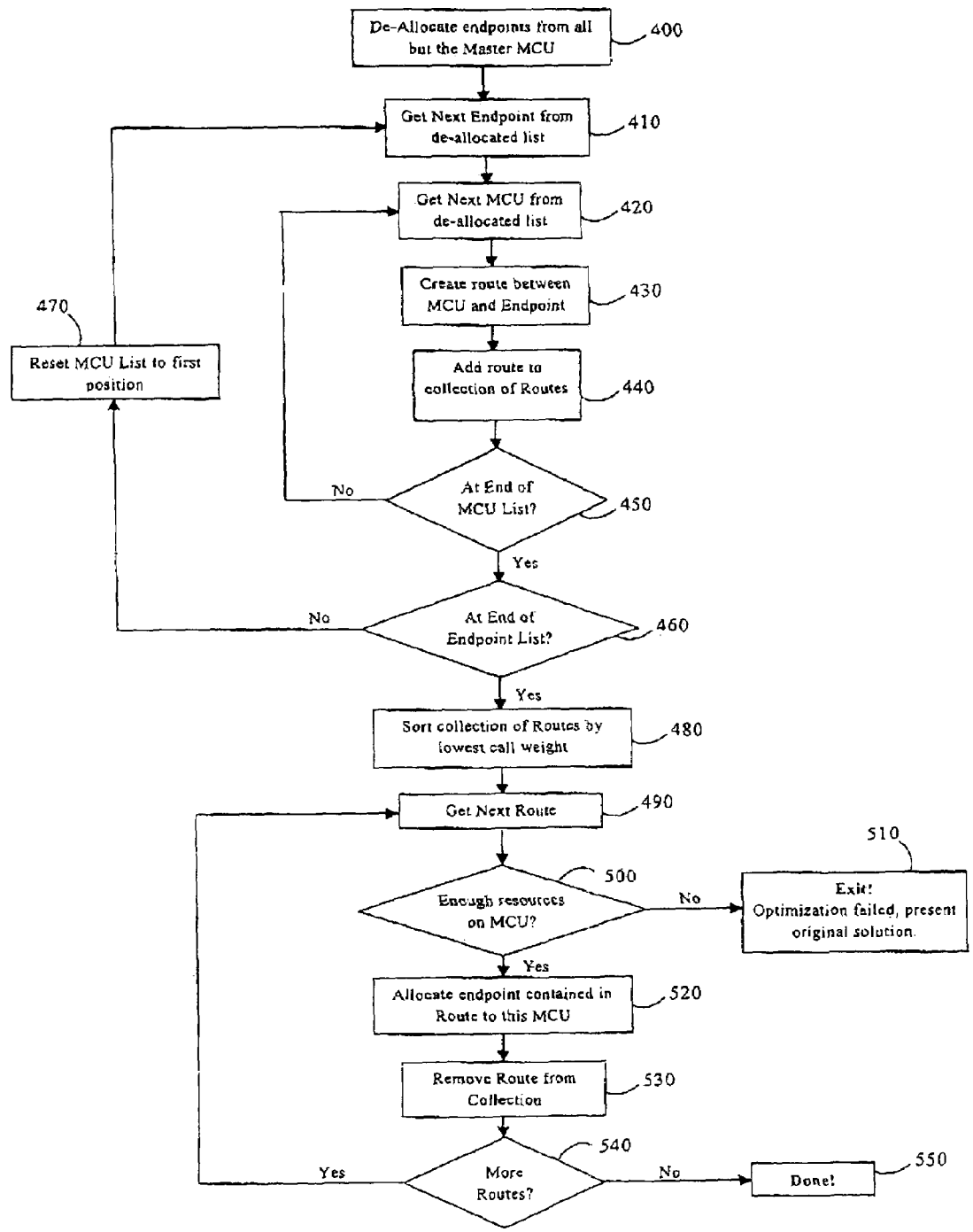

The invention will be described in further detail by reference to the figures, wherein:

FIG. 1 is a schematic block diagram illustrating a call set-up between groups of systems, FIG. 2 is a schematic block diagram illustrating a call set-up with two available MCUs, FIG. 3A is a flow chart illustrating an implementation of the distributed call solution according to the inventive method, and FIG. 3B is the optimization part of the flow chart illustrated in FIG. 3A.

FIG. 1 shows an example of how a call can be set-up between a group of systems. Top left, three systems are connected to an external MCU A. Top right another three systems are connected to external MCU B. There is also a call between MCU A and B to transfer information between the two. At the bottom of the figure, an end point with a build in MCU has another two systems connected to it. This gives a total of nine end points connected to a single conference.

The first part of this invention is to route the call in such a fashion as to automatically connect all systems. This can be done with respect to different factors (call costs, quality, capabilities, etc.). This method allows the call to be set-up without having a centralized location.

The second and unique part of this invention is to have one or more services actively administrating and monitoring the systems in the configurations. The administrator is then given a single interface to set-up, monitor and manage the call. For example to change the person having floor (whose audio and/or video is fed to all other participants) of the conference, request must be sent the MCU A, MCU B and the internal MCU. Instead of the solution used today—where the administrator must go into each of these units to change the call flow, the administrator changes this setting in one location, causing a chain of actions to be taken on the required units in the call—in such a way as the end users see the effect as if the call was administrated from a centralized MCU.

FIG. 2 illustrates an example of a call setup with two available MCUs. It shows how the inventive method sets up a distributed call. This example involves a call with 14 videoconference systems. Instead of the user having setup an entire distributed conference manually, the inventive method automatically generates an optimized cascaded multi-MCU solution when there are more conference systems than available resources on any single MCU.

Assume we have 14 videoconference systems, 7 of which are located in Dallas, Tex., USA, 4 are located in New York City, N.Y., USA and 3 are located in Lysaker, Oslo, Norway. We also have two MCUs, one in Dallas and one in Lysaker. The MCU in Dallas has enough resources to hold 10 of the systems while the MCU in Lysaker has enough resources to hold 8 systems.

Since neither MCU has enough resources to hold all 14 systems we need to cascade two MCUs together. We place all 7 systems from Dallas on the Dallas MCU because they are closest and also place 2 systems from New York on the same MCU. The remaining 10th resource is used to link up to the second MCU in Norway. Since the Dallas MCU is now full we place the 3 systems at Lysaker on the Lysaker MCU and the remaining 2 systems from New York onto this MCU also.

FIG. 3A shows the processes involved in creating a distributed MCU call. The method for automatic generation and allocation of optimized setup of multiple end points (EPs) to multi site connection units (MCUs) in a distributed video conference system comprises the steps.

The first step 100 is to generate an MCU priority list of the available MCUs based on a weighting function that in turn is based on any desirable characteristic or property of the MCUs and number of EPs. This can be the amount of available processing resources in the MCUs, and the bandwidth resources required for the MCUs to connect to the EPs. From this list, the MCU with the best weight is chosen as the master MCU.

The next step 110 is to estimate the number of MCUs needed, based on the number of EPs required to be connected in a current video conference session. From this it is checked in step 120 whether there are enough MCUs. If not, an error message will be displayed 140, and the process of creating a distributed MCU call will stop. If there are enough MCUs, the process will continue with several substeps.

The first substep 130 is to add the required MCUs from the priority list generated in step 100 to a database "chosen" list containing the chosen MCUs.

The next substep 160 is to calculate the necessary links from the master MCU to the other MCUs in the MCU database list generated in step 130.

This is followed by substep 170 where the master MCU is allocated to the EP of the video conference leader (if any). The video conference leader is the EP which is feeding audio and/or video to all other participant.

In step 180, the next MCU in the "chosen" list generated in step 130 is processed. The fist time this will be the master MCU, the second time it will be the MCU with the second best weight after the master MCU etc.

In step 190 a calculation is performed, of a call weight for each EP where cost of a call between EP and MCUs is among factors included in the weight. This is followed by step 200 where an EP priority list for each MCU is generated, i.e. the call weight of each EP to the different MCUs in the "chosen" list generated in step 130.

In step 210 it is checked whether there are remaining EPs in the EP priority list 10 generated in step 200 If not, all the end points in the EP priority list have been processed, and an optimization routine is initiated in step 300. If this is successful, all the systems in the current video conference will be connected together in an optimal was. The optimization routine is described in detail with reference to FIG. 3B in the following.

If there are remaining EPs in the EP priority list, a new test is performed in step 220, checking whether the current MCU processed according to step 180 is full. If it is not, the first EP in the EP priority list generated in step 200 is allocated to the current MCU. This is performed in step 230 followed by step 240 where the first EP is removed from the EP priority list. The loop comprising the steps 210, 220, 230 and 240 are performed until all the EPs have been allocated to a MCU, or until the current MCU is full, i.e. its resources have been used. If this is the case step 250 will be performed.

In step 250, a test of whether the "chosen" list generated in step 130 is empty is performed If not, step 180 described above will be entered again, followed by 190, 200 etc. If the "chosen" list is empty, a check is performed in step 260 of whether a new MCU is available. If this is the case, all the allocated EP performed in step 230 are de-allocated in step 280, and the process once again starts from step 160 after adding the new MCU to the "chosen" list. This is performed in step 150. If a new MCU is not available, an error message will be generated in step 270.

It is desirable to optimize the connection/allocation of EPs and MCUs performed in the previous steps. This is because in some cases the requested resources are much better than necessary and therefore more expensive.

FIG. 3B shows the processes involved in optimizing the final distributed MCU route. The optimization method is performed when all the EPs have been allocated to an MCU, i.e. no error messages have occurred.

The optimization method starts in step 400 by de-allocating EPs from all but the master MCU. De-allocated lists are generated from the generated priority list of allocated EPs to MCUs performed in step 230.

In step 410, the next EP in the de-allocated list is located, and in step 430 the next MCU in the de-allocated list is located. In step 430 a route between the EP and the MCU is created. This is followed in step 440 by adding the route to a collection of routes.

In step 450 it is checked whether the end of the de-allocated MCU list has been reached. If not step 420 will be entered again, and the steps 420, 430, 440 and 450 will be performed until a route between the current EP and the MCUs in the de-allocated list has been created. If the end of the de-allocated MCU list has been reached, a new test is performed in step 460. In this step it is checked whether the end of the EP list has been reached. If not, the MCU de-allocated list is reset to first position in step 470, and the next EP from de EP de-allocated list is located followed by the step 420 to 460 as described above. If step 460 reports that the end of the EP list has been reached, step 480 is entered.

In step 480, the collection of routes obtained from going through steps 400 to 460 is sorted by lowest weight.

In step 490, the next route between an EP and MCU in the sorted collection of routes is located, and in step 500 it is checked whether there are enough resources on the particular MCU. If not, the optimization process failed and the original solution as presented before entering step 300 is presented and executed. If there are enough resources on the particular MCU, step 520 will be entered.

In step 520, the EP contained in the route is allocated to the MCU. This is followed by step 530 where this route is removed from the collection.

A check is performed in step 540 of whether there are more routes in the collection of routes. If this is the case, step 490 will once again be entered, and the following steps 500 to 530 will be performed until all the routes have been assessed.

The optimization process will end in step 500.

The described method allows calls between video conference devices to be set-up in a cost effective way, without having a centralized location.

The method described above with reference to drawings 3A and 3B is considered to be the best mode, and therefore includes the preferred steps. Deviation from the method is possible, and is considered to be within the scope of the invention.

The invention also concerns a device for performing the automatic generation and allocation of optimized setup of multiple EPs to MCUs in a distributed video conference system according to the method described above.

A second object of the invention is to provide a method and device for monitoring and administering several video conference devices within a network. A video conference device may be any device included in the setup of a video conference, e.g. an end point with or without internal MCU, gateway, gatekeeper, MCU etc.

Monitoring: Seeing information about the call, the participants and their status.

Administration: Being able to change the participant's status, add participants, remove participant, etc.

Monitoring and administering a video conference is performed after successful completion of set-up of the devices taking part in the video conference.

The method comprises a first step of gathering and merging call information such as protocols and duration from the devices in the call. This is done by letting each video conference device make its support level for the different functions available to a cache to speed up processing time. This step is followed by checking whether the master device. (typically an MCU—the master device in this solution is either the master MCU in cascaded calls, the MCU in non-cascaded call (internal or external MCU) or the end point with the most capabilities in a point-to-point call) is capable of carrying out a specific command (e g. mute, floor, volume, etc.) upon receiving an administration function. This is followed by the step of checking whether the slave devices are capable of carrying out the specific command if the master device is not capable of performing said command, followed by checking whether the EP that the commands is going to be carried out on is capable of carrying Out the specific command if the master or slave devices are not capable of performing this command. The final step is to execute the command on the devices capable of carrying out the specific command.

According to the invention, the monitoring and administering user interface is operatively connected to the videoconference devices, i.e. it is not necessary to perform these tasks from a centralised server.

In the following three example cases utilising the inventive method of monitoring and administering is described. It is assumed that the systems are connected and in call.

In the different cases, one wants one interface to monitor and manage all calls. The descriptions below show how this is done according the method described above.

Case: Point-to-point.

Monitoring: Call information is gathered from one of the systems in the point-to-point conference. This system is automatically select by as the system with the most capabilities (MultiSite, ISDN bandwidth). This system is called the MASTER system. This information contains information about protocols, duration, etc. If the one system is an out-of-house system, the in-house system is used to gather this information.

Administration: When an administration function is carried out on the conference, depending on the capabilities of the system, the MASTER system is first checked. If the function cannot be carried out on that system the other system is used to execute the function. If the other system is not in-house, the function fails (no system possible to execute function against). Typically volume, mute is controlled at the endpoint that one want to control, whereas continues presence, add/remove participant and floor control is done on the MASTER system.

Case: MCU (internal or external).

Monitoring: Call information is gathered from the system in the MCU conference that is the MCU. This system is called the MASTER system. This information contains information about protocols, duration, etc.

Administration:

When an administration function is carried out on the conference—depending on the capabilities of the system, the MASTER system is first checked (MCU). If the function cannot be carried out on the MASTER system, the system that the function is to be carried out on is checked (e.g. if the MCU does not support Mute, Mute will be executed on the site that is to be muted instead). If the other system is not in-house, the function fails (no system possible to execute function against). Typically volume, mute (with internal MCU) is controlled at the individual endpoint that one want to control, whereas continues presence, add/remove participant, mute (with external MCU) and floor control is done on the MASTER system (MCU—either internal or external).

Case: Cascaded/Distributed MCU (internal or external).

Monitoring: Call information is gathered and merged from all the systems that act as MCUs in the conference. One system will be at the top of the cascading/distribution, this system is called the MASTER system. This merged information contains information about protocols, duration, etc.

Administration: When an administration function is carried out on the conference, depending on the capabilities of the system, the MASTER system is first checked (Master MCU). If the function cannot be carried out on the MASTER system, each of the other MCUs are checked (Slave MCUs), if the slave MCUs also do not support the function, the system that the function is to be carried out on is checked (e.g. if the Master MCU and Slave MCU do not support Mute. Mute will be executed on the site that is to be muted instead). If the other system is not in-house, the function fails (no system possible to execute function against). Typically volume, mute (with internal MCU) is controlled at the individual endpoint that one want to control, whereas continues presence, add/remove participant and mute (with external MCU) is carried out on the master or slave MCUs, whereas floor control is done on the MASTER system (MCU—either internal or external).

How the methods and the actual system control is done will vary from system to system. TANDBERG systems support administration features in other ways than competitors (RadVision, Polycom, Ezenia). The main clue is that each system makes available its support level for different functions, for gathering call information a union of the status of the individual systems is made (to optimize, in most cases one only ask the MASTER system for such information). For administration however, according to the solution presented here, one will first try executing the function on the MASTER system, then on slave MCUs (if they are used) and last on the individual system.

The result is that in most cases and with most features, only the MASTER system needs to be accessed, resulting in less chance of loosing connection due to IP network issues. Since a constant connection can be opened with the Master system, most functions will be accessed, and there is no need to connect to all systems.

The presented solution gives administrators one screen and one way of controlling all conferences, weather they are point-to-point, internal MCU, external MCU or distributed/cascaded conferences. This then avoids the need for large MCUs that all calls must go through to be able to have the same amount of monitoring and administration capabilities.

The invention claimed is:

1. A method for automatic generation and allocation of optimized setup of multiple end points (EPs) to multi site connection units (MCUs) in a distributed video conference system, comprising the steps of:
   a) estimating the number of MCUs needed, based on the number of EPs required to be connected in a video conference session,
   b) checking that there is a sufficient number of MCUs available according to the estimation by allocating each EP to an MCU,
   c) allocating EPs to MCUs, by connecting EPs to MCUs, characterized in that said allocating step c) is performed according to a weighting function, and that said allocating step comprises the substeps of:
      generating de-allocated lists, from the generated priority list of allocated EPs to MCUs, of EPs from all but a master MCU,
      creating routes between each EP and each MCU in the MCU de-allocated list,
      adding these routes to a list with a collection of routes, sorting list with collection of routes by lowest weight call, allocating each EP contained in the collection of routes to a preferred MCU, if sufficient resources are available on the MCU, and removing all other routes in the sorted list where this EP is present.

2. The method of claim 1, where the estimation of the number of MCUs needed further comprises the substeps of:

generating an MCU priority list of the available MCUs based on a weighting function, based on any desirable characteristic or property of the MCUs and number of EPs, choosing the MCU with the best weight as the master MCU.

3. The method of claim 2, where the generated MCU priority list is sorted by location, bandwidth and channels at the time of a scheduled meeting.

4. The method of claim 3, where the allocation of the EP contained in the collection of routes to its MCU is aborted and the allocated route before the allocating step c) is selected if there are insufficient resources on the MCU in question.

5. The method of claim 1, where the checking of the estimated number of MCUs needed further comprises the substeps of:

calculating the necessary links from the master MCU to the other MCUs in the MCU priority list, allocating the master MCU to the EP of the video conference leader (if any), calculating the call weight for each EP where cost of a call between EP and MCUs is among factors included in the weight, generating an EP priority list for each MCU, allocating each EP to an MCU according the generated priority lists for the EPs and the MCUs.

6. The method of claim 5, where the calculation of the call weight further includes the factor of bandwidth.

7. The method of claim 5, where the generated EP priority list is sorted by different weighting factors where cost and bandwidth are among the factors prioritised.

8. The method of claim 7, where the generated EP priority list is sorted by one of the weightings factors.

9. The method of claim 7, where the generated EP priority list is sorted by a weighting factor.

10. The method of claim 5, where the allocation of each EP to an MCU is performed according to a sorted list of available MCUs.

11. The method of claim 5, where the allocation of each EP to an MCU is performed until all the EPs are allocated to a MCU.

12. The method of claim 5, where each allocated EP is de-allocated if one or more EPs are not allocated due to lack of resources on the MCUs in the EP priority list.

13. The method of claim 12, where the de-allocated EPs are re-allocated after adding a new MCU to the MCU priority list.

14. The method of claim 5, where EPs are allocated to the next MCU on the priority list when the previous MCU is occupied.

15. A device for automatic generation and allocation of optimized setup of multiple end points (EPs) to multi site connection units (MCUs) in a distributed video conference system, comprising:

a. an estimating unit, arranged for estimating the number of MCUs needed, based on the number of EPs required to be connected in a video conference session, b. a checking unit, arranged for checking that there is at least enough MCUs as required according to the estimation by allocating EPs to MCUs, and c. an allocating unit, arranged to allocate EPs to MCUs, by connecting EPs to MCUs, characterized in that said allocating unit is arranged for connecting the EPs to the MCUs according to a weighting function, and that said allocating unit for the allocation of EPs to MCUs further comprises:

means for generating de-allocated lists, from the generated priority list of allocated EPs to MCUs, of EPs from all but a master MCU, means for creating routes between each EP and each MCU in the MCU de-allocated list, means for adding these routes to a list with a collection of routes, means for sorting the list with collection of routes by lowest weight call, means for allocating each EP contained in the collection of routes to a preferred MCU, depending on availability of sufficient resources, and means for removing all other routes in the sorted list where this EP is present.

16. The device of claim 15, where the estimation unit for estimating the number of MCUs needed further comprises:

means for generating a MCU priority list of the available MCUs based on a weighting function, based on any desirable characteristic or property of the MCUs and number of EPs, means for choosing the MCU with the best weight as the master MCU.

17. The device of claim 15, where the checking unit arranged for estimating the number of MCUs needed further comprises:

means for calculating the necessary links from the master MCU to the other MCUs in the MCU priority list, means for allocating the master MCU to the EP of the video conference leader, means for calculating the call weight for each EP where cost of a call between EP and MCUs is among factors included in the weight, means for generating an EP priority list for each MCU, means for allocating each EP to an MCU according the generated priority lists for the EPs and the MCUs.

* * * * *